US011772334B2

(12) United States Patent
Roach et al.

(10) Patent No.: US 11,772,334 B2
(45) Date of Patent: *Oct. 3, 2023

(54) MANUFACTURING OF POLYETHYLENE THIN FILMS FOR HIGH-ALTITUDE BALLOONS

(71) Applicant: Aerostar International, LLC, Columbia, MD (US)

(72) Inventors: Kevin Roach, Sandpoint, ID (US); Jacques Gagne, Los Gatos, CA (US)

(73) Assignee: Aeroster International, LLC, Sioux Fall, SD (US)

( * ) Notice: Subject to any disclaimer, the term of this patent is extended or adjusted under 35 U.S.C. 154(b) by 130 days.

This patent is subject to a terminal disclaimer.

(21) Appl. No.: 17/472,417

(22) Filed: Sep. 10, 2021

(65) Prior Publication Data

US 2022/0055316 A1    Feb. 24, 2022

Related U.S. Application Data

(63) Continuation of application No. 15/783,399, filed on Oct. 13, 2017, now Pat. No. 11,135,781.

(Continued)

(51) Int. Cl.
*B29C 65/72* (2006.01)
*B29C 35/08* (2006.01)
(Continued)

(52) U.S. Cl.
CPC .......... *B29C 65/72* (2013.01); *B29C 35/0866* (2013.01); *B29C 48/0018* (2019.02);
(Continued)

(58) Field of Classification Search
CPC ....... B29C 65/72; B29C 65/226; B29C 65/18; B29C 65/7441; B29C 65/0044; B29C 48/92; B29C 48/10; B29C 48/919; B29C 48/0018; B29C 48/0021; B29C 66/0044; B29C 66/8122; B29C 66/81417;
(Continued)

(56) References Cited

U.S. PATENT DOCUMENTS 3,149,017 A * 9/1964 Ehrreich ................. B29C 71/04
156/289
5,674,607 A * 10/1997 Schirmer .............. B32B 27/322
428/509
(Continued)

OTHER PUBLICATIONS

"U.S. Appl. No. 15/783,399, Advisory Action dated Feb. 1, 2021", 3 pgs.
(Continued)

*Primary Examiner* — Benjamin P Lee
(74) *Attorney, Agent, or Firm* — Kim and Lahey Law Firm, LLC

(57) ABSTRACT

Aspects of the disclosure relate to manufacturing a balloon envelope for use in a stratospheric balloon system. For instance, a stream of polyethylene mixture us extruded through an extruder in order to orient molecules of polymer chains of polyethylene and to provide an oriented film. The oriented film is passed through an electron beam and thereby crosslinking the polymer chains to provide a cross-linked film. The cross-linked film is heat sealed to form the balloon envelope.

23 Claims, 15 Drawing Sheets

Related U.S. Application Data

(60) Provisional application No. 62/554,070, filed on Sep. 5, 2017.

(51) Int. Cl.

| | |
|---|---|
| *B29C 65/18* | (2006.01) |
| *B64B 1/58* | (2006.01) |
| *B29C 65/00* | (2006.01) |
| *B29C 48/00* | (2019.01) |
| *B29C 55/28* | (2006.01) |
| *B29C 48/92* | (2019.01) |
| *B29C 49/04* | (2006.01) |
| *B29C 48/88* | (2019.01) |
| *B29C 65/74* | (2006.01) |
| *B29C 48/10* | (2019.01) |
| *B29L 22/02* | (2006.01) |
| *B29C 48/08* | (2019.01) |
| *B29L 31/30* | (2006.01) |
| *B29C 35/10* | (2006.01) |
| *B29C 65/22* | (2006.01) |

(52) U.S. Cl.
CPC .......... *B29C 48/0021* (2019.02); *B29C 48/10* (2019.02); *B29C 48/919* (2019.02); *B29C 48/92* (2019.02); *B29C 49/04* (2013.01); *B29C 55/28* (2013.01); *B29C 65/18* (2013.01); *B29C 65/7441* (2013.01); *B29C 66/028* (2013.01); *B29C 66/2442* (2013.01); *B29C 66/3452* (2013.01); *B29C 66/43* (2013.01); *B29C 66/4326* (2013.01); *B29C 66/71* (2013.01); *B29C 66/7315* (2013.01); *B29C 66/73115* (2013.01); *B29C 66/73711* (2013.01); *B29C 66/73754* (2013.01); *B29C 66/73756* (2013.01); *B29C 66/73921* (2013.01); *B29C 66/81427* (2013.01); *B29C 66/836* (2013.01); *B29C 66/8322* (2013.01); *B29C 66/86533* (2013.01); *B64B 1/58* (2013.01); *B29C 35/10* (2013.01); *B29C 48/08* (2019.02); *B29C 65/226* (2013.01); *B29C 66/0044* (2013.01); *B29C 66/8122* (2013.01); *B29C 66/81417* (2013.01); *B29C 66/9672* (2013.01); *B29C 2035/0877* (2013.01); *B29K 2023/06* (2013.01); *B29L 2022/022* (2013.01); *B29L 2031/3076* (2013.01)

(58) Field of Classification Search
CPC .............. B29C 66/9672; B29C 66/028; B29C 66/2442; B29C 66/3452; B29C 66/43; B29C 66/4326; B29C 66/71; B29C 66/73115; B29C 66/7315; B29C 66/73711; B29C 66/73754; B29C 66/73756; B29C 66/73921; B29C 66/81427; B29C 66/8322; B29C 66/836; B29C 66/86533; B29C 2035/0877; B29C 2023/06; B29C 35/0866; B29C 35/10; B29C 49/04; B29C 55/28; B29L 2022/022; B29L 2031/3076; B64B 1/58

See application file for complete search history.

(56) References Cited

U.S. PATENT DOCUMENTS

| | | | |
|---|---|---|---|
| 9,475,567 B1 * | 10/2016 | Roach | ................ B64B 1/58 |
| 11,135,781 B2 | 10/2021 | Roach et al. | |
| 2015/0174817 A1 | 6/2015 | Roach et al. | |
| 2019/0070792 A1 | 3/2019 | Roach et al. | |

OTHER PUBLICATIONS

"U.S. Appl. No. 15/783,399, Examiner Interview Summary dated Jan. 6, 2021", 2 pgs.

"U.S. Appl. No. 15/783,399, Examiner Interview Summary dated Mar. 8, 2021", 2 pgs.

"U.S. Appl. No. 15/783,399, Final Office Action dated Nov. 30, 2020", 9 pgs.

"U.S. Appl. No. 15/783,399, Non-Final Office Action dated Feb. 17, 2021", 10 pgs.

"U.S. Appl. No. 15/783,399, Non-Final Office Action dated Jun. 22, 2020", 7 pgs.

"U.S. Appl. No. 15/783,399, Notice of Allowance dated Jun. 4, 2021", 10 pgs.

"U.S. Appl. No. 15/783,399, Response filed Jan. 8, 2021 to Final Office Action dated Nov. 30, 2020", 7 pgs.

"U.S. Appl. No. 15/783,399, Response filed Feb. 3, 2021 to Advisory Action dated Feb. 1, 2021", 7 pgs.

"U.S. Appl. No. 15/783,399, Response filed May 1, 2020 to Restriction Requirement dated Mar. 27, 2020", 8 pgs.

"U.S. Appl. No. 15/783,399, Response filed May 24, 2021 to Non-Final Office Action dated Feb. 17, 2021", 9 pgs.

"U.S. Appl. No. 15/783,399, Response filed Sep. 18, 2020 to Non-Final Office Action dated Jun. 22, 2020", 13 pgs.

"U.S. Appl. No. 15/783,399, Restriction Requirement dated Mar. 27, 2020", 6 pgs.

"Electron Beam Processing", [online]. Retrieved from the Internet: <https://en.wikipedia.org/wiki/Electron-beam_processing>, (2017), 4 pgs.

"Kuhne Anlagenbau GmbH, We take on the responsibility", kuhne-ab.de, [online]. Retrieved from the Internet: <https://kuhne-ab.de/?article_id=15&clang (translation)>, downloaded (2017), (2017), 2 pgs.

"Kuhne Anlagenbau GmbH, We take on the responsibility", kuhne-ab.de/ (translation), [online] Retrieved from the Internet: <https://kuhne-ab.de/ (translate)>, (2017), 2 pgs.

"Kuhne flatfilm and sheetlines—Know-How for your application", [online]. Retrieved from the Internet: <http://www.kuhne-group.com/index.php?menuid=23&reporeid=14>, (2017), 2 pgs.

"Kuhne's blown film lines—Our modular principle", [online]. Retrieved from the Internet: <http:/lwww.kuhne-group.com/index.php?menuid=24&reporeid=15>, (2017), 3 pgs.

"Polypropylene", [online]. Retrieved from the Internet: <https://en.wikipedia.org/wiki/Polypropylene>, (2017), 11 pgs.

"The Kuhne Group—Specialists for flat film, blown film and sheet extrusion", [online]. [archived Mar. 17, 2017]. Retrieved from the Internet: https://web.archive.org/web/20170317051834/http://www.kuhne-group.com/index.php?getlang=en, (2017), 2pgs.

Rand, J. L., et al., "Long Duration Balloon Technology Survey", (1989), 65 pgs.

* cited by examiner

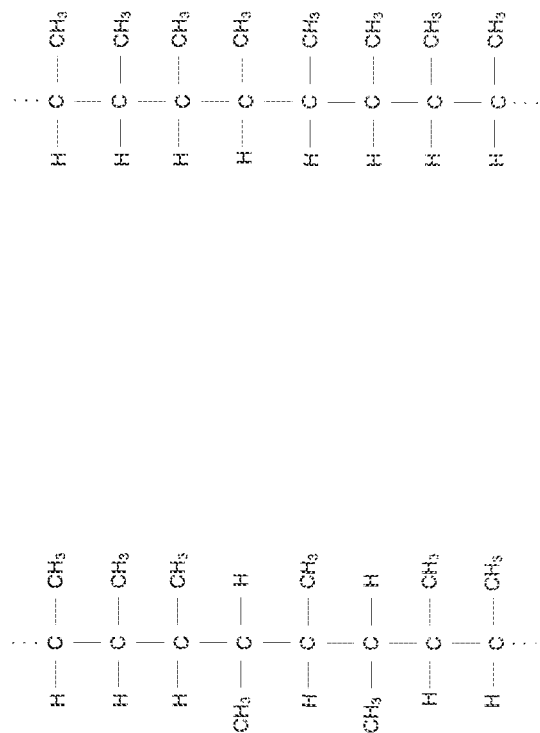
FIGURE 6
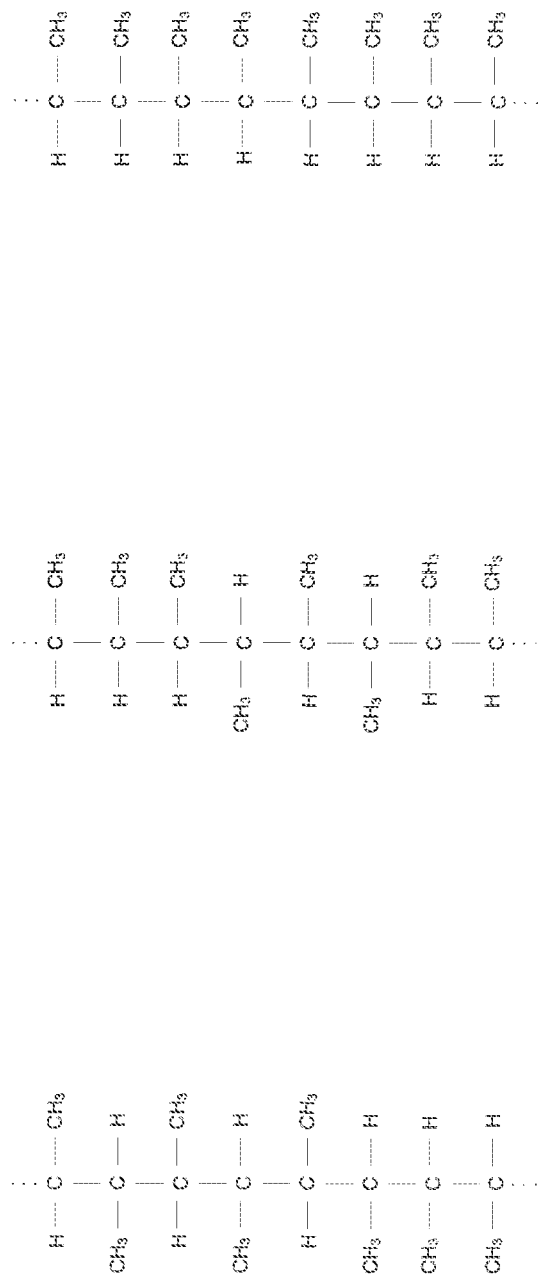
FIGURE 5
FIGURE 4

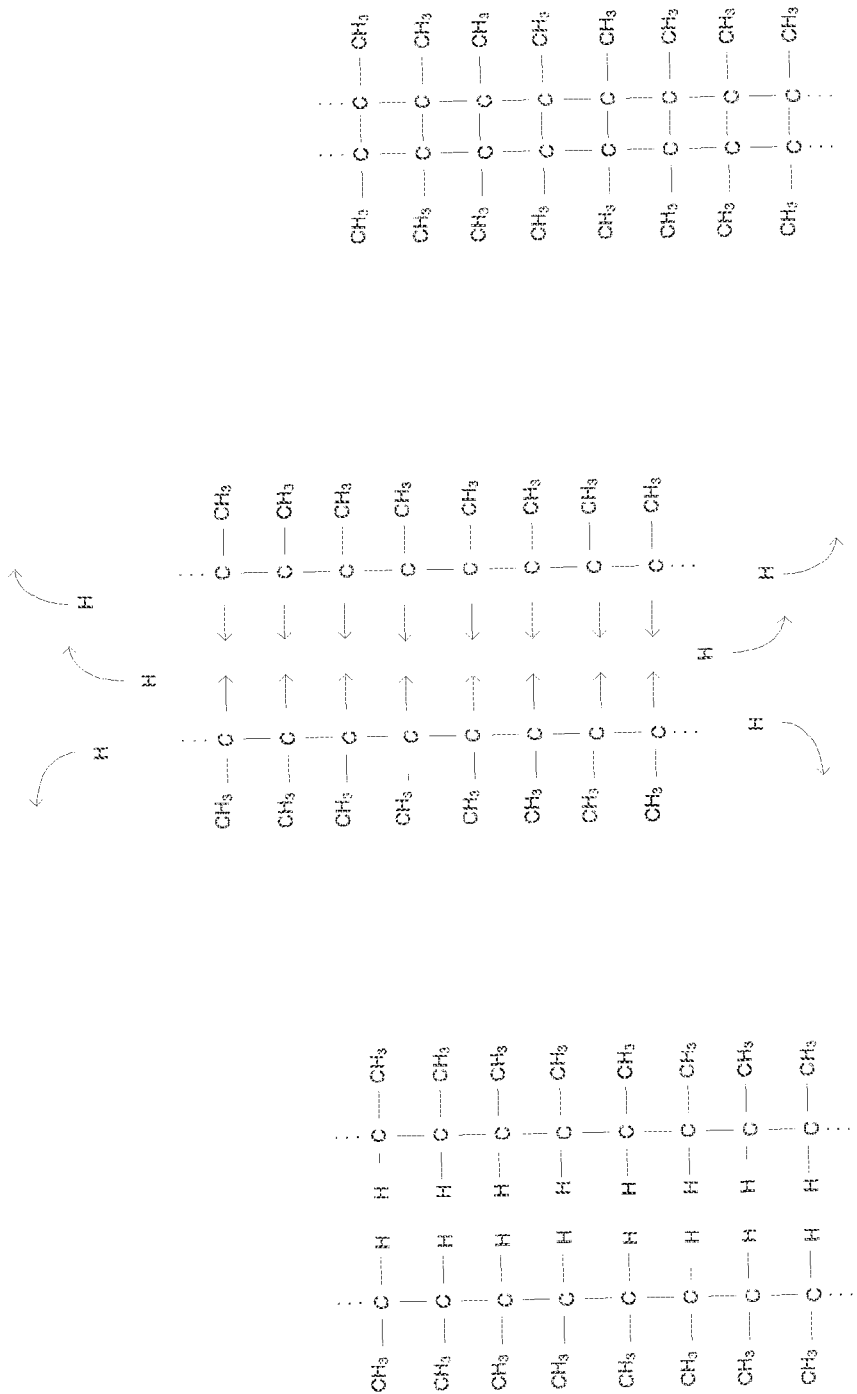

| Characteristic | Film 1 | Film 2 |
|---|---|---|
| Mpa/(df*g/cm3) | 0.7498976611 | 4.079914721 (assuming 110 MPa) |
| Yield/Failure Stress (MPa) (TD @ -40C) | 31 | 129 (seal failure stress) 179 (pure film failure) |
| Yield/Failure Strain (TD @ -40C) | 7.97% | 4.64% (2% offset) |
| Ultimate Elongation (TD @ -40C) | >400% | 84.3% |
| Ductile blister failure @ -70C | yes | Yes |
| Blister failure @ -40C (kPa) | 9.33 | 23 |
| Pinch Test (no folds baseline) @ -40C (kPa) | 16-17 | 33.3 |
| Seal/Tendon Pinch failure @ -40C (kPa) | 16 | 27.2 |
| Pinch Test (with folds) @ -40C (kPa) | 8.5 (pinch area yielded) | 25.5 (burst) |
| Gelbo Flex Holes (TD @ -60C 270 cycles) | 5 | 1 |
| Gelbo Flex Holes (MD @ -60C 270 cycles) | 12 | 0 |
| Toughness (TD +23 °C) (J/m3*10^4) | 155.67 | 99.97 |
| High Rate Ultimate Elongation (TD @ -80C) (%) | 10.1% | 30.7% |
| High Rate Ultimate Elongation (MD @ -80C) (%) | 128% | 97% (no drop comparing to slow rate) |
| Melting Point (C) | 121.7 | 119 |
| Crystallinity % | 44.5% | 61% |
| Thermal Emissivity (@ 193 K) | 0.084 | 0.024 |
| Thermal Emissivity (@ 233 K) | 0.089 (0.040/mil) | 0.033 (0.033/mil) |
| Thermal Emissivity (@ 298 K) | 0.098 | 0.045 |
| Solar Absorptivity (AM0 @ 298K) | 0.017 (0.0077/mil) | 0.006 (0.006/mil) |

MANUFACTURING OF POLYETHYLENE THIN FILMS FOR HIGH-ALTITUDE BALLOONS

CROSS-REFERENCE TO RELATED APPLICATIONS

The present application is a continuation of Ser. No. 15/783,399, filed Oct. 13, 2017, which claims the benefit of the filing date of U.S. Provisional Patent Application No. 62/554,070 filed Sep. 5, 2017 the entire disclosure of which is hereby incorporated herein by reference.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network. Because of the various forces experienced by these balloons during deployment and operation, there is a balancing of needs between flexibility and stability of materials. As such, the balloons include a flexible envelope made of material that may be configured in sections or gores to create a "pumpkin" or lobed balloon. These lobes are supported by a plurality of tendons. During normal operations, the balloon envelope is filled with gas so that it can float above the Earth.

Typically, given at the altitudes in the stratosphere at which these balloons are used, the materials of the balloon's envelope must have suitable properties for operation at very low temperatures. In this regard, the envelopes are made from polyethylene or polyethylene-based films. However, current commercially produced polyethylene films, such as those developed by NASA, suffer from inconsistency in strength and characteristics which can cause balloons manufactured from these films subject to unexpected failures including, for instance, viscoplastic tearing. For instance, these films often include stress areas where the film is inherently weak. When the gores of an envelope are expanded during inflation, the forces are concentrated in the stress areas which can result in yielding in strips or zones as well as striations. These weaknesses may cause the stress areas to take on additional stresses during flight, subjecting the stressed areas to popping, ripping, or tearing. As a result, the usefulness, reliability and lifespan of the balloon may be reduced.

BRIEF SUMMARY

One aspect of the disclosure provides a method of manufacturing a balloon envelope for use in a stratospheric balloon system. The method includes extruding a stream of polyethylene mixture through an extruder in order to orient molecules of polymer chains of polyethylene and to provide an oriented film. The method also includes passing the oriented film through an electron beam and thereby cross-linking the polymer chains to provide a cross-linked film. The method also includes heat sealing the cross-linked film to form the balloon envelope.

In one example, the method also includes blowing a bubble into the oriented film and cooling the bubble using a water quenching process in order to increase optical clarity of the oriented film, cross-linked film, and the balloon envelope. In another example, passing the oriented film through the electron beam causes the electron beam to hit a first outer surface of the oriented film, and the method also includes passing the oriented film through a second electron beam causing the second electron beam to hit a second outer surface of the second film, the second outer surface being opposite of the first outer surface. In another example, when the oriented film is passed through the electron beam, the oriented film is arranged as a tube. In another example, the method also includes, after blowing the bubble, pressing the cross-linked film to a desired thickness and the pressed cross-linked film is heat sealed to form the balloon envelope.

Another aspect provides a balloon envelope manufactured according to the aforementioned method. In one example, a strength to weight ratio of the balloon envelope is greater than 1 MPa/dt*g/cm3). In another example, TD tensile strain is less than 2 mm/mm for a tensile stress of 100 MPa at 23 C with a 50 mm/min pull rate. In another example, MD tensile strain is less than 2 mm/mm for a tensile stress of 100 MPa at 23 C with a 50 mm/mm pull rate. In another example, TD tensile strain is less than 2 mm/mm for a tensile stress of 140 MPa at −40 C with a 50 mm/min pull rate. In another example, MD tensile strain is less than 2 mm/mm for a tensile stress of 140 MPa at −40° C. with a 50 mm/min pull rate. In another example, TD tensile strain is less than 2 mm/mm for a tensile stress of 150 MPa at −60° C. with a 50 mm/min pull rate.

In another example, MD tensile strain is less than 2 mm/mm for a tensile stress of 150 MPa at −60° C. with a 50 mm/min pull rate. In another example, the high rate elongation at −80 C for TD is greater than 20%. In another example, crystallinity is greater than 50%. In another example, thermal emissivity is less than 0.03 at 193K. In another example, thermal emissivity is less than 0.04 at 233K, in another example, thermal emissivity is less than 0.05 at 298K. In another example, solar absorptivity is less than 0.01 at 298K. In another example, a thickness of the cross-linked film of the balloon envelope less than 1.5 mil.

BRIEF DESCRIPTION OF THE DRAWINGS

FIGS. 4-6 are example diagrams of polymer chains in accordance with aspects of the disclosure.

FIGS. 8-10 are example polymer chains in accordance with aspects of the disclosure.

FIG. 14 is an example table in accordance with aspects of the disclosure.

DETAILED DESCRIPTION

The technology relates to polyethylene films for high-altitude, for instance, stratospheric balloons. These balloons can be used in communication networks, and therefore longevity and reliability are important characteristics. A typical balloon in such networks may include a balloon envelope, payload, and a plurality of tendons attached to the envelope. According to aspects of the disclosure, the envelope is made of a specially prepared polyethylene film.

The balloon envelope may be formed from a polyethylene film manufactured using an improved double-bubble blown-film extrusion process with water quenching and electron beam (e-beam) processing. This produces a highly-oriented, cross-linked thin film with high optical clarity and other improvements over previous films used for stratospheric balloons. This film material may then be used to manufacture a balloon envelope using a heat sealing process.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Example Balloon Network

Figure 1:
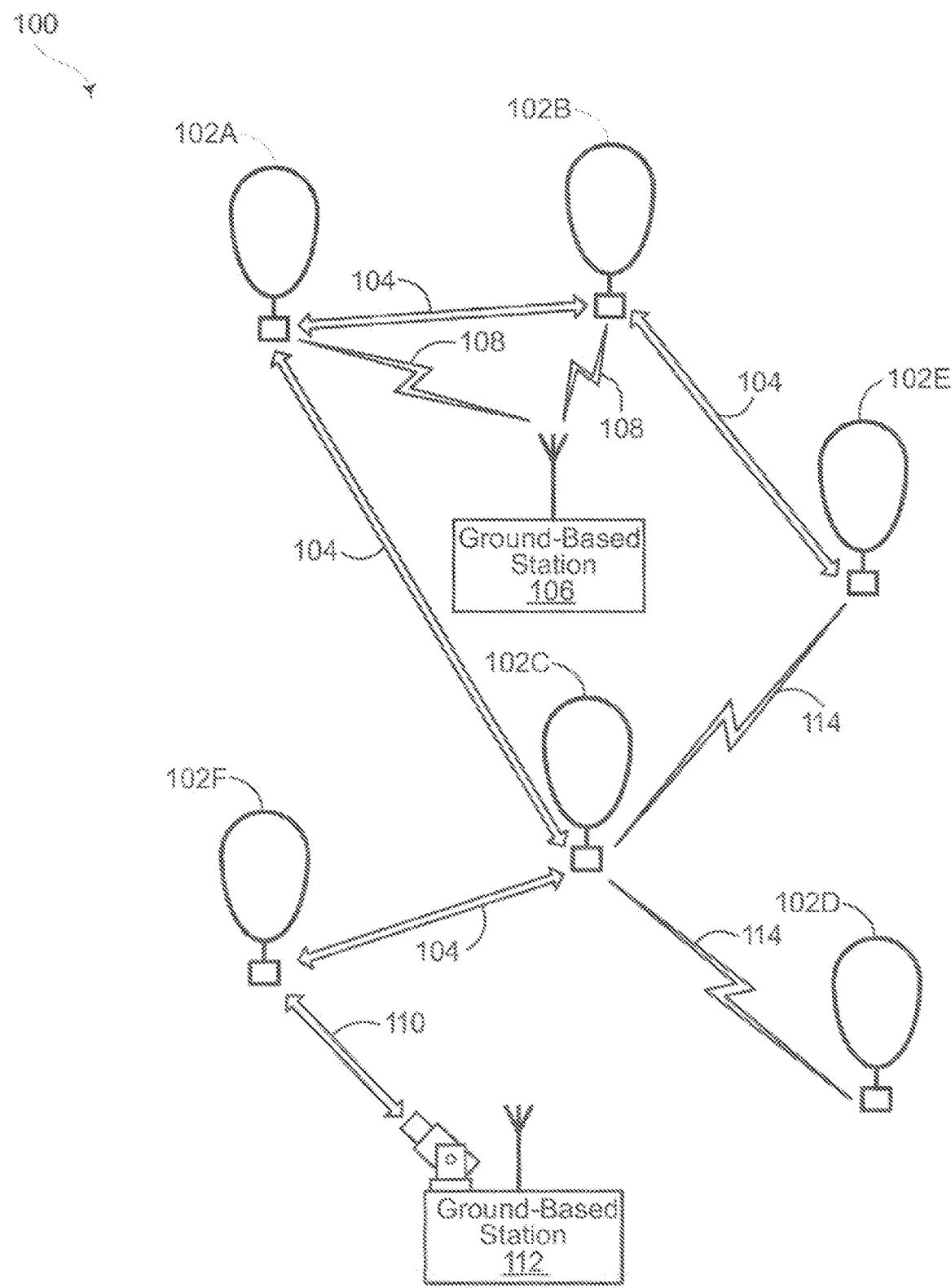
FIG. 1 is a functional diagram of a network in accordance with to aspects of the disclosure.

FIG. 1 depicts an example network 100 in which a balloon as described above may be used. This example should not be considered as limiting the scope of the disclosure or usefulness of the features of the films and balloon envelopes as described herein. For example, the films may be employed on various types of balloons, such as balloons carrying telescopes, surveillance gear, weather sensors or other types of standalone balloons or balloons used with other types of systems. In this example, network 100 may be considered a "balloon network." The balloon network 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
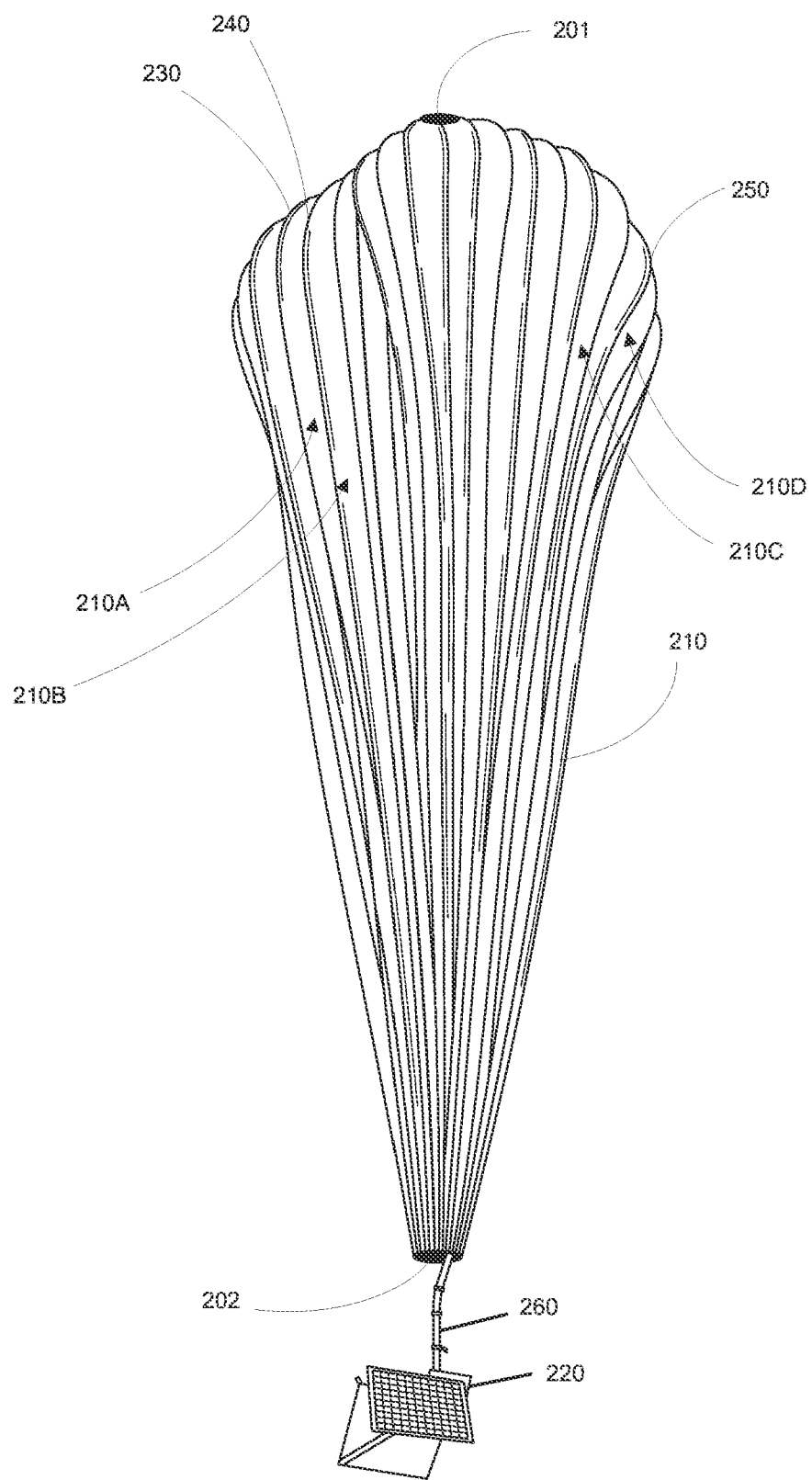
FIG. 2 is an example of a balloon in accordance with aspects of the disclosure.

FIG. 2 is an example stratospheric balloon 200, which may represent any of the balloons of balloon network 100. As shown, the balloon 200 includes a balloon envelope 210, a payload 220 and a plurality of tendons 230, 240 and 250 attached to the balloon envelope 210.

The balloon envelope 210 may take various forms. In one instance, the balloon envelope 210 may be constructed from materials such as polyethylene that do not hold much load while the balloon 200 is floating in the air during flight. Further, the volume of the balloon envelope may be on the order of 2000 cubic meters. However, the shape and size of the balloon envelope 210 may vary depending upon the particular implementation. Additionally, the balloon envelope 210 may be filled with various gases or mixtures thereof, such as helium, hydrogen or any other lighter-than-air gas. The balloon envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processor's and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polypropylene, polyethylene, polyethylene terephthalate, or other polyethylene based films which are lightweight, yet have suitable strength properties for use as a balloon envelope. In this example, balloon envelope 210 is comprised of envelope gores 210A-210D.

Figure 3:
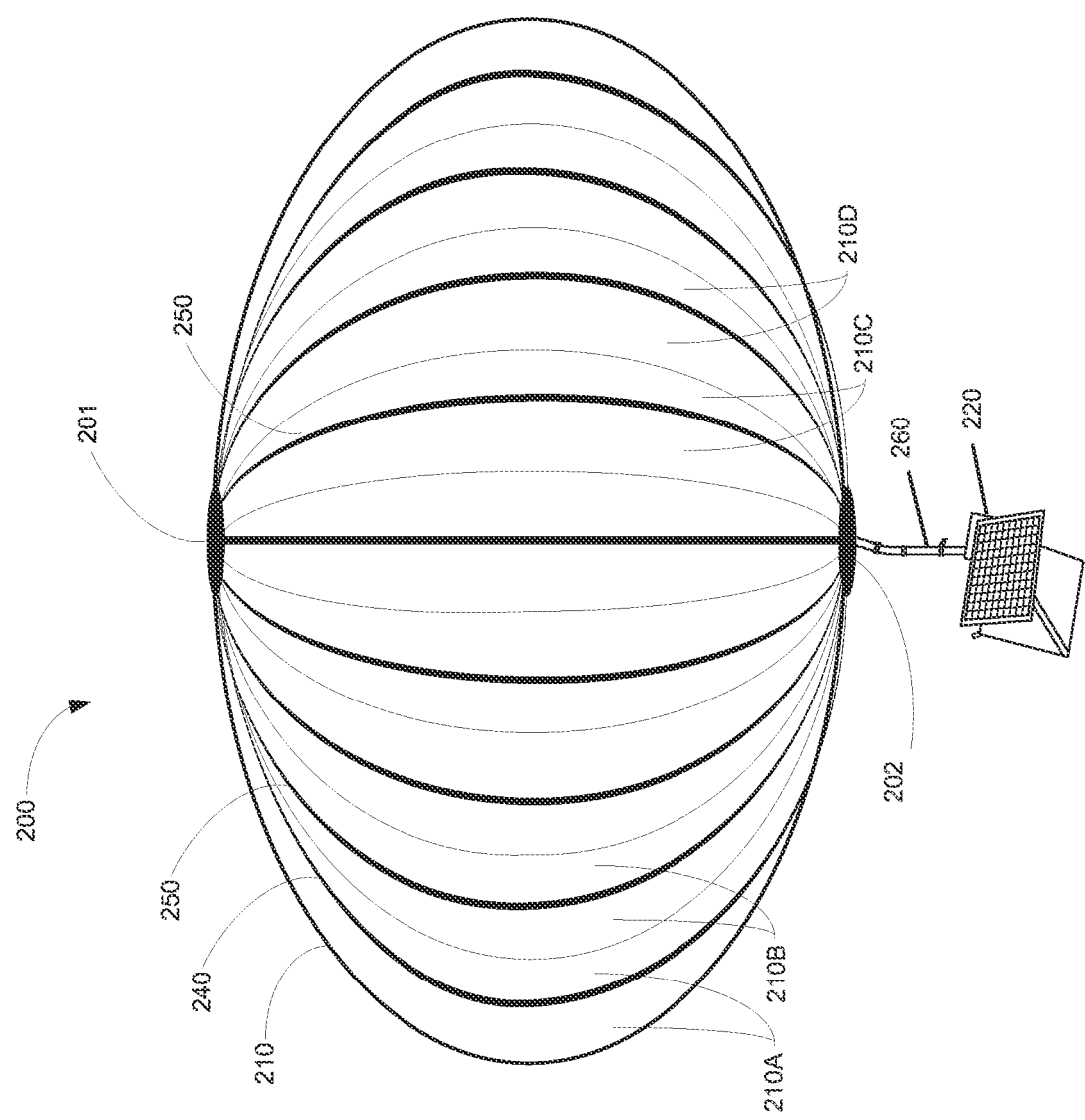
FIG. 3 is an example of a balloon in accordance with aspects of the disclosure.

Pressurized lift gas within the balloon envelope 210 may cause a force or load to be applied to the balloon 200. In that regard, the tendons 230-250 provide strength to the balloon 200 to carrier carry the load created by the pressurized gas within the balloon envelope 210. As shown more clearly in FIG. 3, the tendons are arranged along a centerline of each of the gores 210A-210B. Alternatively, the tendons may be arranged at the seams between the gores. In some examples, a cage of tendons (not shown) may be created using multiple tendons that are attached vertically and horizontally. Each tendon may be formed as a fiber load tape that is adhered to a respective envelope gore. Alternatively, a tubular sleeve may be adhered to the respective envelopes with the tendon positioned within the tubular sleeve.

Top ends of the tendons 230, 240 and 250 may be coupled together using a type of plate, such as top cap 201 positioned at the apex of balloon envelope 210. Bottom ends of the tendons 230, 240 and 250 may also be connected to one another. For example, a corresponding plate, e.g., bottom cap 202, is disposed at a base or bottom of the balloon envelope 210. The top cap 201 at the apex may be the same size and shape as and bottom cap 202 at the bottom. Both caps include corresponding components for attaching the tendons 230, 240 and 250. In some examples, the top cap 201 may serve a mounting point for certain systems attached to the balloon 200.

FIG. 2 depicts the balloon envelope 210 inflated with lift gas close to ground level, for instance, at atmospheric pressure. As the balloon rises and the atmospheric pressure drops, the lift gas within the balloon envelope expands, changing the shape of the balloon envelope. Eventually, for instance, when the balloon envelope reaches the stratosphere, the lift gas in the balloon envelope causes the balloon envelope to form more of a rounded pumpkin shape depicted in FIG. 3.

Example Film Manufacturing

In one example, the balloon envelope 210 is manufactured from a polyethylene film manufactured using an improved double-bubble blown-film extrusion process with water quenching and e-beam processing. This produces a polyethylene film with improved characteristics over existing films.

The double-bubble blown-film extrusion line is typically used to manufacture thin films for various purposes. The process begins with the melting of resins into a molten stream of a viscoelastic polyethylene mixture including 0.92 density ldpes such as commercially available materials DOWLEX 2045 g and 2256 g by The Dow Chemical Company. Plastometers, such as Queo 0203 by Borealis AG, anti-block, slip agents such as polysiloxanes or erucamides, and UV stabilizing antioxidant suites may also be used. The molten stream is extruded through an extruder and passed through a die opening of a certain size. For instance, a primary extruder may include a 6 inch opening. This smaller opening provides for some orienting of the molecules in the polymer chains of the film. In other words, some of the methyl (CH3) groups in the film are aligned on the same side as a carbon backbone of the polymer strings, which creates a greater degree of crystallinity and results in a stiffer film. FIGS. 4 and 5 demonstrate this orientating for a single example polymer chain. For instance, in FIG. 4, $CH_3$ molecules and hydrogen atoms are randomly distributed along a carbon backbone. The extrusion increases the numbers of $CH_3$ molecules arranged on the same side of the carbon backbone and also increases the numbers of hydrogen atoms arranged on the opposite side of the carbon backbone as shown in FIG. 5.

The film is then blown into a first bubble and a vacuum is used to keep the bubble open (i.e. prevent collapsing of the bubble). Additional orientation of the film is achieved by controlling the rate at which the film is being pulled and the diameter of the bubble. Again, orienting the polymer chains in the film, may increase the stiffness in the film and reducing the likelihood of stress areas which, as noted above, can weaken the film and the final balloon envelope. As shown between FIGS. 5 and 6, the orientating arranges the polymer chains such that many of the hydrogen atoms are on one side of the carbon backbone and many of the $CH_3$ molecules are arranged on another side of the carbon backbone. Actual values may be difficult to determine, but greater orientation may provide for greater cross-linking as discussed further below.

The film is then cooled to a temperature such that the film is approximately at a softening point of the resin mixture, such as below 110° C. or more or less. In some examples, to provide for improved optical characteristics of the film, while still molten, the oriented film is water quenched, or plunged into a water bath, in order to cool the bubble to below 110° C. The water quenching both lubricates the film and increases the optical clarity of the film and also reduces the crystal size of the polyethylene providing a smooth surface texture and ensuring that the film does not, melt to itself or stick to processing equipment. When the balloon envelope is in flight, a more optically clear film has a lower thermal emissivity and absorbs less heat from the sun. As a result, the temperature within the balloon is lower and thus the pressure is lower, which effectively reduces the strength requirements for the film. The balloon envelope (and film) are mechanically stronger at the lower temperature. In addition, because less energy is absorbed, more energy passes directly the balloon envelope allowing for less shadowing of the solar panels below and improving power gain.

Figure 7:
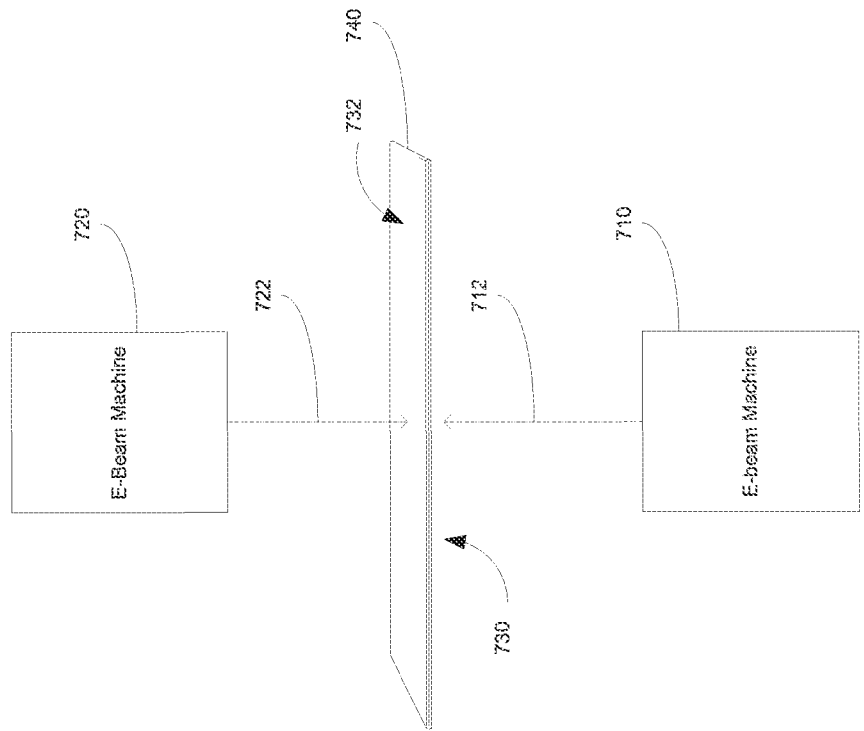
FIG. 7 is an example electron beam process in accordance with aspects of the disclosure.

After being cooled, the film is collapsed fiat as two thick layers of material in a tube configuration as shown in FIG. 7. At this point, the two-layer film passes through an e-beam machine or a series of e-beam machines which includes ne or more electron guns configured to fire a beam of electrons at a top outer surface and a bottom outer surface of the film at the same time. For instance, as shown in FIG. 7. e-beam machine 710 fires an electron beam 712 at a bottom outer surface 730 of the oriented film 740. At the same time, e-beam machine 720 fires an electron beam 722 at a top outer surface 732 of the oriented film 740.

The electron beams cause bonds between hydrogen and carbon atoms in the film to break. The hydrogen molecules are released as gas, and the carbon atoms, where the hydrogen atoms were decoupled, are bonded together. These carbon bonds create a lattice-like or cross-linked structure within the film which cannot be achieved through typical blown manufacturing. For instance, as shown in FIG. 8, two oriented polymer chains are arranged adjacent to one another. The electron beam causes hydrogen atoms to break away from the carbon backbone and are released as gas as shown in the example of FIG. 9. In FIG. 10, the carbon atoms from adjacent chain are then bonded to form the cross-linking.

The cross-linked film is reheated to a molten state and blown into a second bubble from the opposite side (opposite of the first bubble). Using the e-beam machines prior to inflating the film into the second bubble may provide for better bubble stability and greater orientation levels for the film.

The re-heated cross-linked film is then passed through a series of rollers to achieve a film of the desired thickness. The resulting film material is a highly-oriented, cross-linked film with high optical clarity which may be less than 1.6 mil thick, such as 1.5 mil, 1 mil, 0.75 mil, 0.5 mil or more or less. This film material may then be used to manufacture a balloon envelope as described herein.

The film could also be manufactured using various additives and/or a triple-bubble process. This process would include the oriented and cross-linked film being blown into a third bubble. In this scenario, the third bubble is heated and stretched again. This additional bubble and stretching may provide for an increase in the elongation characteristics of the film as compared to what is produced by the double-bubble blown-film extrusion line process described above. This third bubble processing may also reduce the amount of shrinkage that occurs during heat sealing the film to manufacture the balloon envelop, as discussed further below, as well as increase the amount of elastic deformation of the film before plastic deformation when stretched or the balloon envelope inflated.

Example Balloon Manufacturing

In some examples, manufacturing of the balloon envelope involves heat sealing portions of the film material in order to produce the gores. For instance, portions of film material which will form the gores may be laid out on a table and then sealed together, for example, using a heat bond. This heat bond of the film material can be employed using various techniques.

Figure 11:
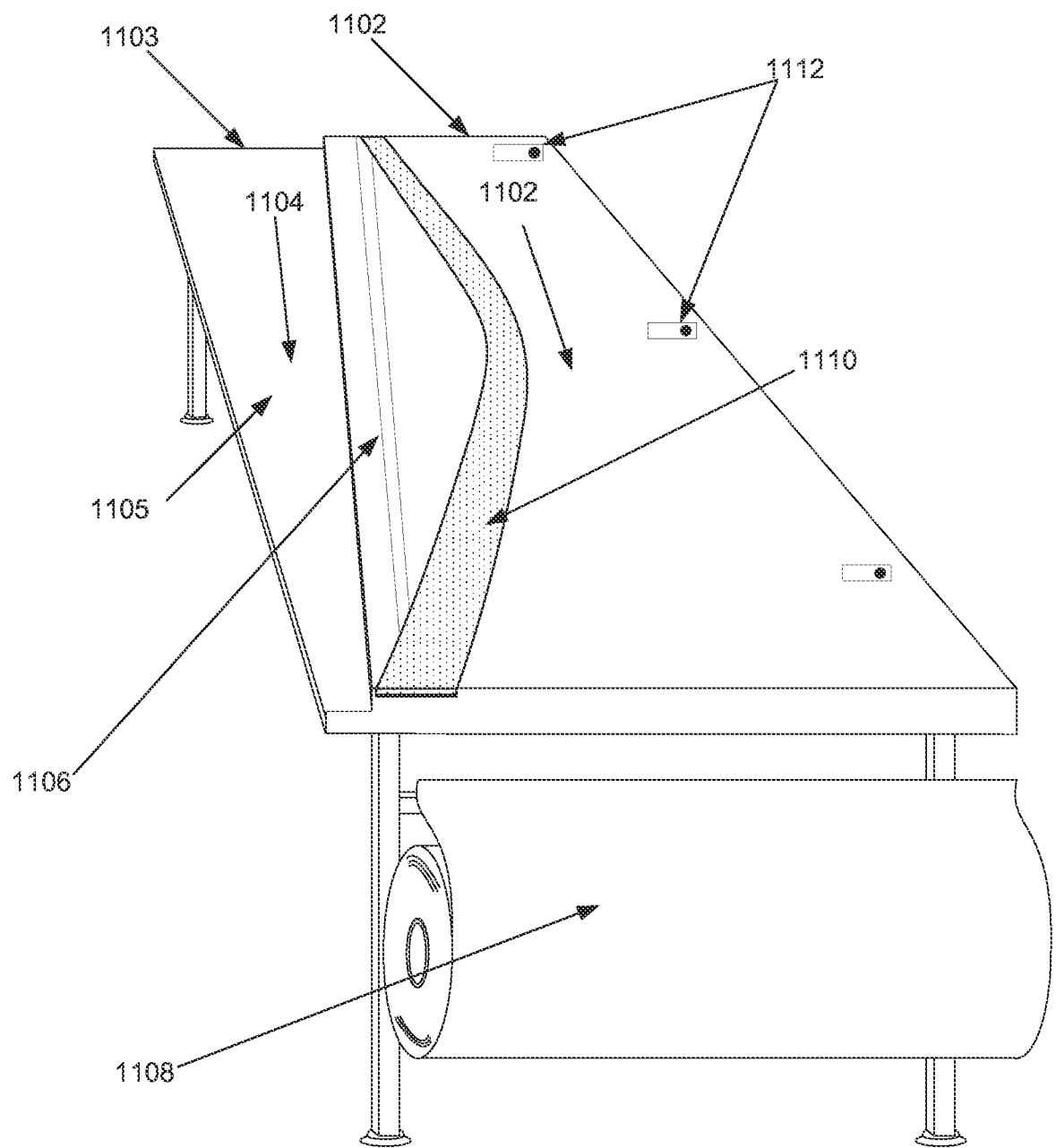
FIG. 11 is an example of a table component of a balloon gore manufacturing apparatus in accordance with aspects of the present disclosure.

In one example, a balloon gore sealing machine or assembly including a table may be used. In FIG. 11, one example of a table component 1100 for the assembly is shown. As shown, the table component 1100 includes a first level 1102 and a second level 1104 and an indicator 1106 disposed on a surface 1103 of the first level 1102. The indicator 1106 may be used to mark a position on the table component 1100 for placing a tendon on an envelope gore being manufactured. The table component 1100 made me may be used for shaping and heat-sealing together individual envelope gores made form sheets of film material 1108 (shown as rolled). In this regard, the table component 1100 also includes a curve strip 1110 that can be used to indicate where the heat seal may occur, for example, at an edge of the envelope gore created form the roll of the film material 1108.

A sheet of the film material 1108 may be fed onto the table component 1100 in order to create a given envelope gore. For example, a straight sheet of the film material 1108 may be rolled out onto the table either manually or automatically using a belt driven track (not shown). Once the film material 1108 is rolled out, it may be held down on the table component 1100 using a series of restraints or clamps 1112. The series of clamps 1112 may help keep the film material 1108 from shifting while it is being worked on.

First level 1102 may be a working area of the table component 1100. The first level 1102 may include a smooth top layer of a compliant film material, such as fiberglass and/or silicone, or other types of similar film materials that have a level of heat resilience. The table component 1100 may include also additional heat resistant film material where the heat seal occurs, such as a curve strip 1110. The curve strip 1110 may include additional film material, such as fiberglass impregnated with a polytetrafluoroethylene PTFE) coating, which has a higher melting point than the top layer coating of the table component 1100. This extra coating may also help prevent the film material 1108 from sticking to the table component 1100 due to the heat sealing being conducted at the strip 1110.

Second level 1104 of the table component 1100 may be configured for stacking up assembled envelope gores of the balloon envelope. For example, the second level 1104 may include a trough like resting area for holding the envelope gores during manufacture. A surface 1105 of the second level 1104 may be configured so that the surface is wide enough to stack up a plurality of assembled envelope gores including the tendon attached to each gore portion.

Figure 12:
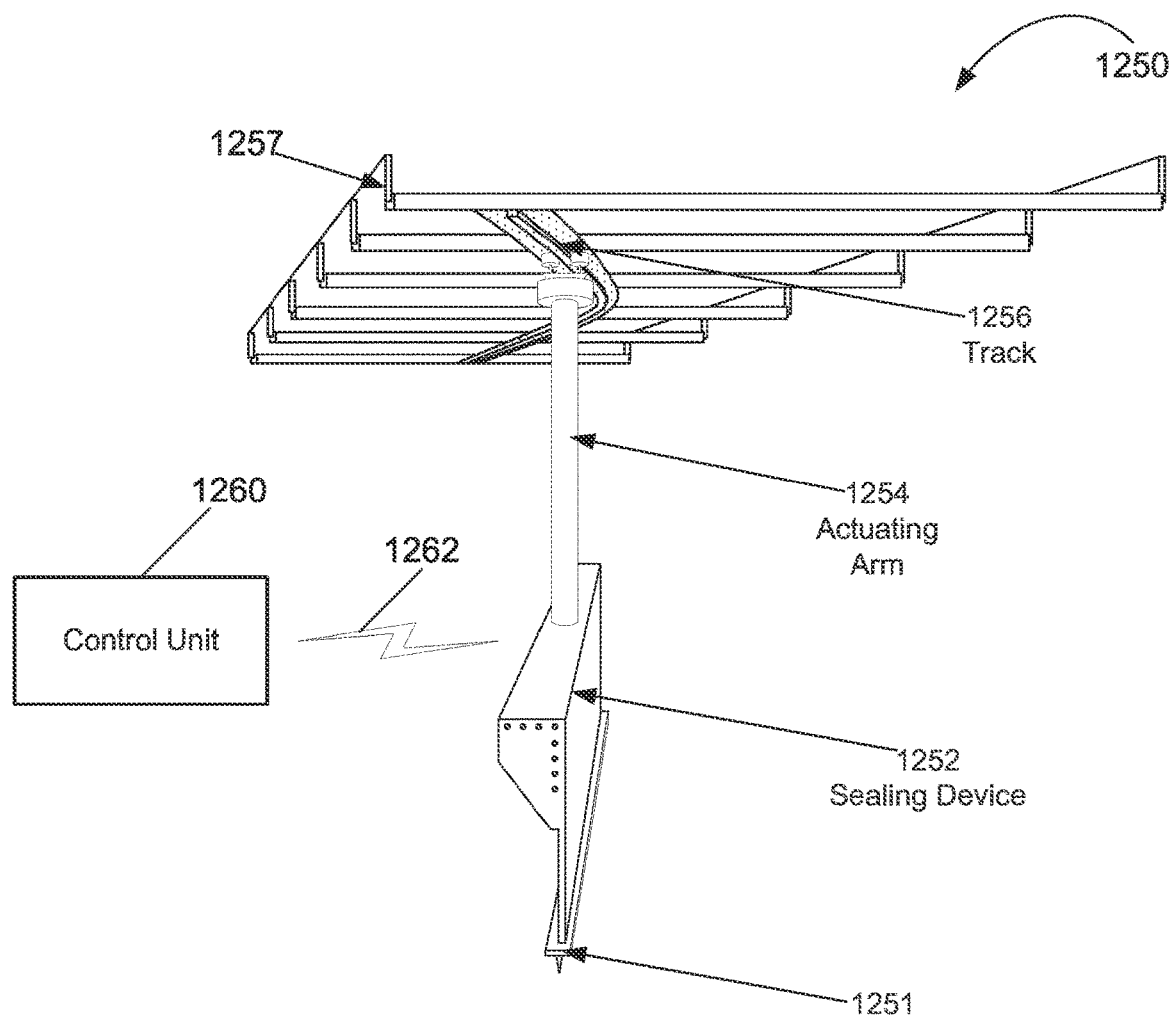
FIG. 12 is an example of a heat sealer component of a balloon gore manufacturing apparatus in accordance with aspects of the present disclosure.

An overhead heat sealer may be used in order to at least partially automate the manufacturing process. FIG. 12 is an example of a sealing component 1250 for the assembly. In this example, the sealing component 1250 includes a sealing device 1252 coupled to the track 1256 via an actuating arm 1254. In some examples, a control unit 1260 may be utilized for controlling operations of the sealing component 1250 using communication link 1262, which can be a wired or wireless link. In this regard, the control unit 1260 may be a computing device including processors and memory storing data and instructions which may automatically control the functions of the sealing component 1250 with or without a human operator.

Sealing device 1252 may include an electrically heatable element 1251 disposed on the device. The heatable element 1251 may be of a predetermined width and length that may be used to unite layers of the balloon material. For example, the heatable element 1251, when activated, for example by a flow of electricity, may reach a certain temperature that is hot enough to heat bond or otherwise melting a section of two sheets of balloon material together. In some embodiments, sealing device 1252 may provide a combination of operations for heat sealing and cutting of the balloon material 1108. For example, the sealing device 1252 may be configured to cut the balloon material 1108 by using heat and an amount of pressure or blade like cutting members (not shown) attached to the heatable element 1251.

The sealing component 1250 may be configured so that it can travel along a length of the table by traversing a track positioned above the table. For example, sealing device 1252 may be moved along track 1256 mounted on an overhead support 1257. The track 1256 can be configured so that sealing device 1252 can move forward and back horizontally by using actuating arm 1254. This forward and back movement of the sealing device 1252 along track 1256 can be manually or automatically operated, for example, by using commands from the communication unit 1260.

The actuating arm 1254 can also be activated to cause the sealing device 1252 to move vertically. For example, the actuating arm 1254 may include housing (not shown) that can extend and retract the arm between first and second positions. In some aspects, extension of the actuating arm 1254 allows the sealing device 1252 to be pressed against the balloon material in order to cause the heat bond activation. As with the movement along track 1256, the actuating arm 1254 can extend and/or retract manually, automatically or some combination thereof, for example, by using commands from control unit 1260.

Figure 13:
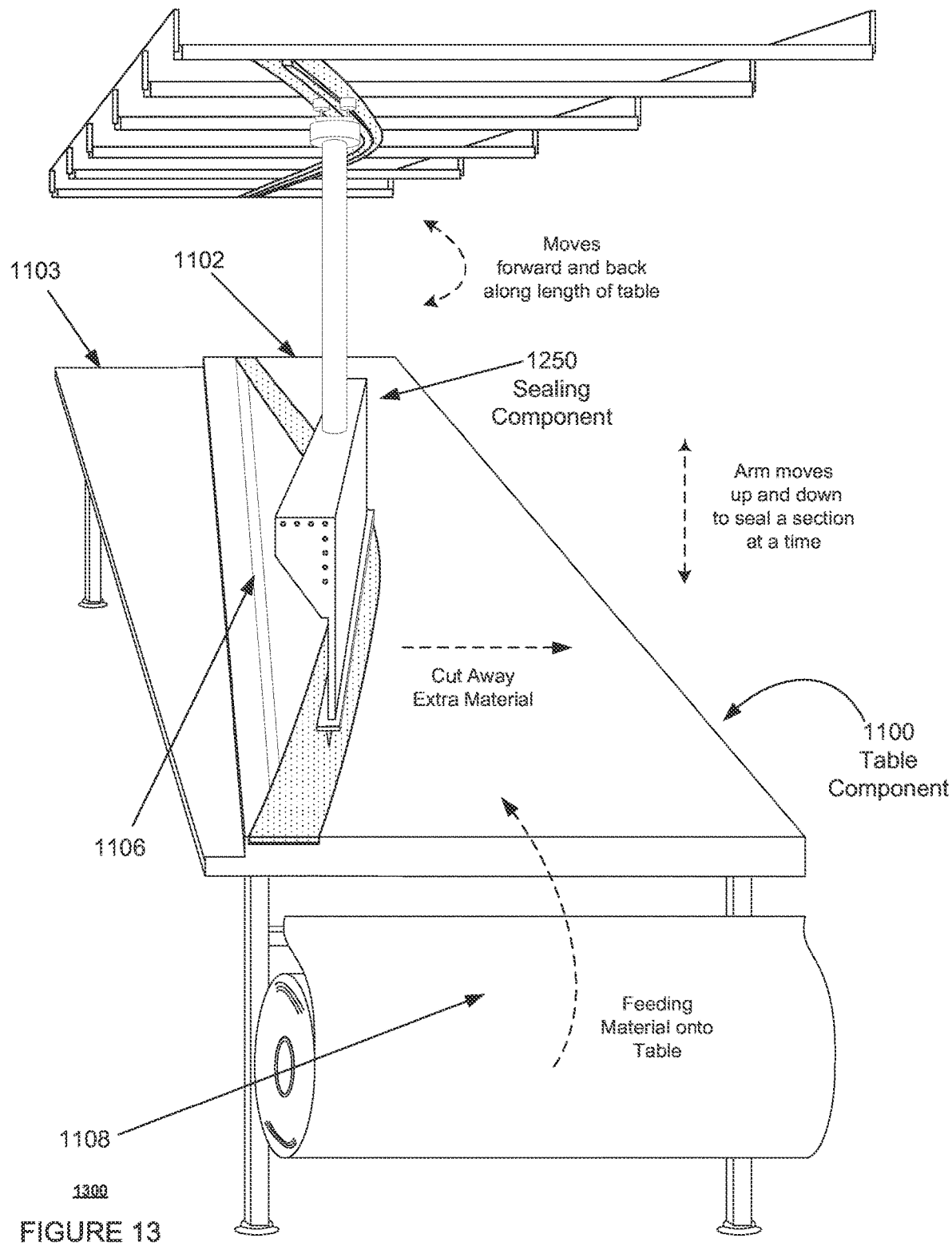
FIG. 13 is an example of a balloon gore manufacturing apparatus in accordance with aspects of the present disclosure.

FIG. 13 is an example of a balloon gore sealing assembly 1300, which may include machinery components such as the table component 1100 and sealing component 1200 as described above. The assembly 1300 tray be used to manufacture envelope gores for balloons. To join the sheets of the film material together, sealing component 1250 may move forward and back from one end of table component 1100 to an opposite end, thereby traversing along a length of the table component 1100. The sealing component 1250 may operate by heat sealing a section, for example by one meter more or less in length, of the film material 1108 resting on the first level. For example, sealing component 1250 may be pressed down on the table component 1100 for heating sealing a particular section of the envelope gore film material and subsequently lifted up and moved to a next section to be heat sealed. This up, move and down motion of the sealing component 1250 can be repeated until the entire length of the laid out film material is heat sealed in successive sections resulting in a completed envelope gore. The tendons may be sealed to the balloon envelope at these heat seals between the gores or at the center of the gores as discussed above. The process of manufacturing envelope gores can be repeated with the successive sheets of film material 1108 until a sufficient number of gores have been manufactured.

Benefits of Improved Film and Balloon Envelope

The film and balloon envelope manufacturing processes described herein provide for cross-linking which maximizes the strength to weight ratio of the film while providing for the optical clarity characteristics needed for stratospheric ballooning.

For demonstration purposes, the film manufactured as discussed above will be compared to a conventional film, such as NASA StratoFilm 420 by Charter NEX Films Inc. at 2.2 mil using DOW 2256 g resin.

FIG. 14 is an example table 1400 which demonstrates the characteristics of the film ("Film 2") produced using improved double-bubble blown-film extrusion process discussed above with the water quenching and e-beam processing to those of film 1. As used herein, "MD" refers to the meridional or machine direction of the films while "TD" refers to the transverse direction of the film. Generally, these films are stronger in the MD direction. The balloon envelopes may be manufactured such that the MD runs perpendicular to the tendon while the TD runs parallel to the tendon (from the top plate to the base plate).

As can be seen, despite being as much as half as thin as Film 1, Film 2 demonstrates numerous beneficial characteristics over Film 1 and therefore may greatly exceed the performance of Film 1 when used in stratospheric balloons. Referring to table 1400, the specific strength or strength to weight ratio of Film 2 (Mpa/(dt*g/cm$^3$)) is more than double and as much as 4 times that of Film 1. This is a comparative metric. In that regard, larger numbers may indicate a lighter and smaller balloon which has a lower cost and a higher payload capacity.

The Yield/Failure Stress may correspond to seal failure or the zero slope yield value. In this example, the design failure mode is the TD yielding of the lobe. While Film 1 performs slightly better than Film 2 in this test; however, there is a trade off between seal failure and elongation. In other words, the benefits of greater elongation may outweigh the slightly higher expected yield failures at seals of balloon envelopes.

The blister failure test pressurizes the films to failure with a seal along the MD. Ductile blister failure refers to the film yielding out along a fracture line rather than shattering in a brittle manner. In this regard, Film 2 fails at a much higher pressure than Film 1.

The pinch test pressurizes the films to failure with a small ripple, wrinkle or pinch of material such as what might occur if a tendon is too long or attached to the balloon envelope improperly and may even occur to a lesser extent in properly manufactured balloons. In other words, the tendon is by design shorter than the film along the path in which it runs to allow for extra film to exist in the wide part of the gore between the tendons (when the tendons are arranged at the seals between the gores. Small folds of material will exist under the tendons simply because there is more film than tendon. This may be managed somewhat by distributing the film such that the excess is even along the length, but it is sometimes more or less evenly distributed. The "no folds baseline" test film without such folds or seals to provide a baseline comparison for the "with folds" test. Because the "seal/tendon" test tests a seal at a tendon, this "seal/tendon" test has very different geometry than the "no folds baseline" and therefore, the "no folds baseline" typically does not provide a reasonable comparison. Film 2 with half the thickness could reach to nearly double failure pressure (33.3 kPa versus 16-17 kPa). As such, a balloon envelope made from film 2 should reach a higher burst pressure than a balloon envelope made from film 1, even where the pinching occurs at a tendon or seal (which are about 25% weaker than the rest of the films).

Gelbo flex holes are essentially pinholes created using short stroke conditions via a commercially available Gelbo Flex Tester. This may replicate theorized ascent and/or pressurization related damage to the balloon envelopes. The number of holes generally increases when there is additional material interacting with the film, such as a tendon, a tendon sleeve, or seal which causes an increased thickness in the balloon envelope. The number of holes may also increase as the stiffness of the film increases. While these pinholes may not generally cause catastrophic failures of the balloon envelope, they may reduce the lifespan of the balloon by creating pathways for lift gas to escape the balloon envelope. In other words, the Gelbo flex hole values of Film 2 may demonstrate that a balloon envelope made of film 2 would have a longer lifespan in flight than a balloon envelope made of Film 1.

The toughness is a function of elongation and strength which may indicate robustness to handling damage and energy absorbed by the film or balloon envelope prior to ultimate failure. For instance, toughness may be a measure of the area under the strain curve prior to failure. In this regard, Film 1 has a greater toughness than Film 2. The toughness of the film may be achieved by adjusting the blow up ratio and amount of crosslinking in the film.

The high rate ultimate elongation values may indicate brittle the film is at low temperatures as well as how the film might behave to shock loads such as those seen during ascent when a balloon envelope interacts with the jet stream. More elongation prior to failure at high rate pulls is better. Lower values may indicate a more brittle film at higher load rates.

The lower melting point of Film 2 as compared to Film 1, while not critical to the function of balloon envelopes in use the stratosphere, may improve manufacturing throughput for the balloon envelopes as a lower melting point may allow for faster heat sealing.

As can be seen, the crystallinity of Film 2 is greater than 50% and also significantly greater than that of Film 1. A greater crystallinity value reduces the likelihood of creep, but may be worse for fatigue and ductility within a given resin. Of course, these values may vary with different types of resins.

As discussed above, the improved optical clarity of Film 2 over Film 1, also affects the thermal emissivity and solar absorptivity of the films. As an example, typical polyethylene films may have an optical clarity around 92% whereas the films produced as described above may reach optical clarity levels above 95% such as 97% or more or less. The emissivity and absorptivity values of Table 1400 correspond to the fraction of the incoming spectrum that is absorbed by the film. The rest is either reflected or transmitted. For instance, the thermal emissivity of Film 2 is less than 0.03 at 193K, less than 0.04 at 233 K, and less than 0.05 at 298 K. Similarly, the solar absorptivity is less than 0.01 at 298 K. Again these values for Film 2 are significantly lower than Film 1 and as such, when in flight, a balloon envelope made of Film 2 may be stronger than a balloon envelope made of film 1.

Figure 15:
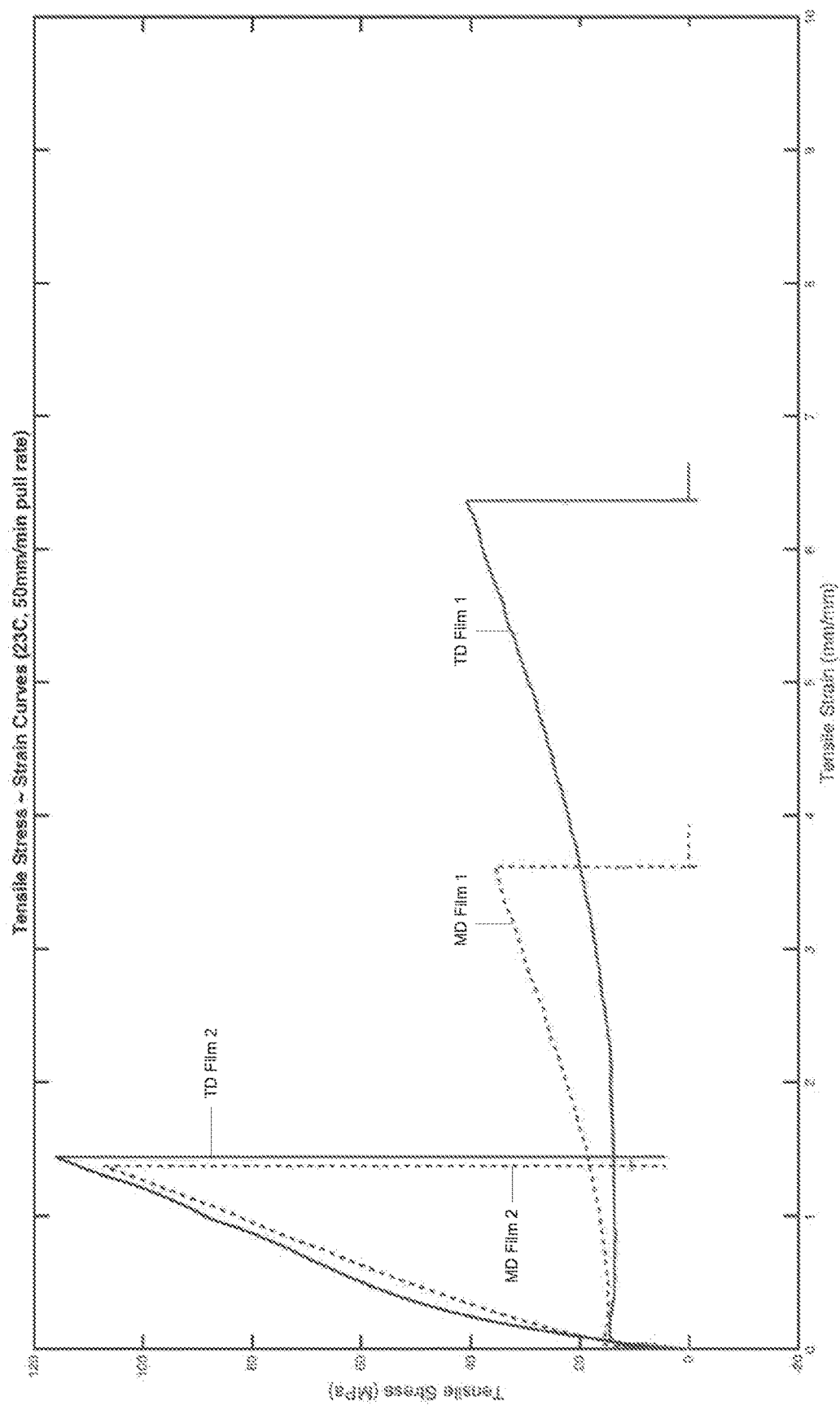
FIGS. 15, 16A, 16B, and 17 are example testing results in accordance with aspects of the disclosure.
Figure 16A:
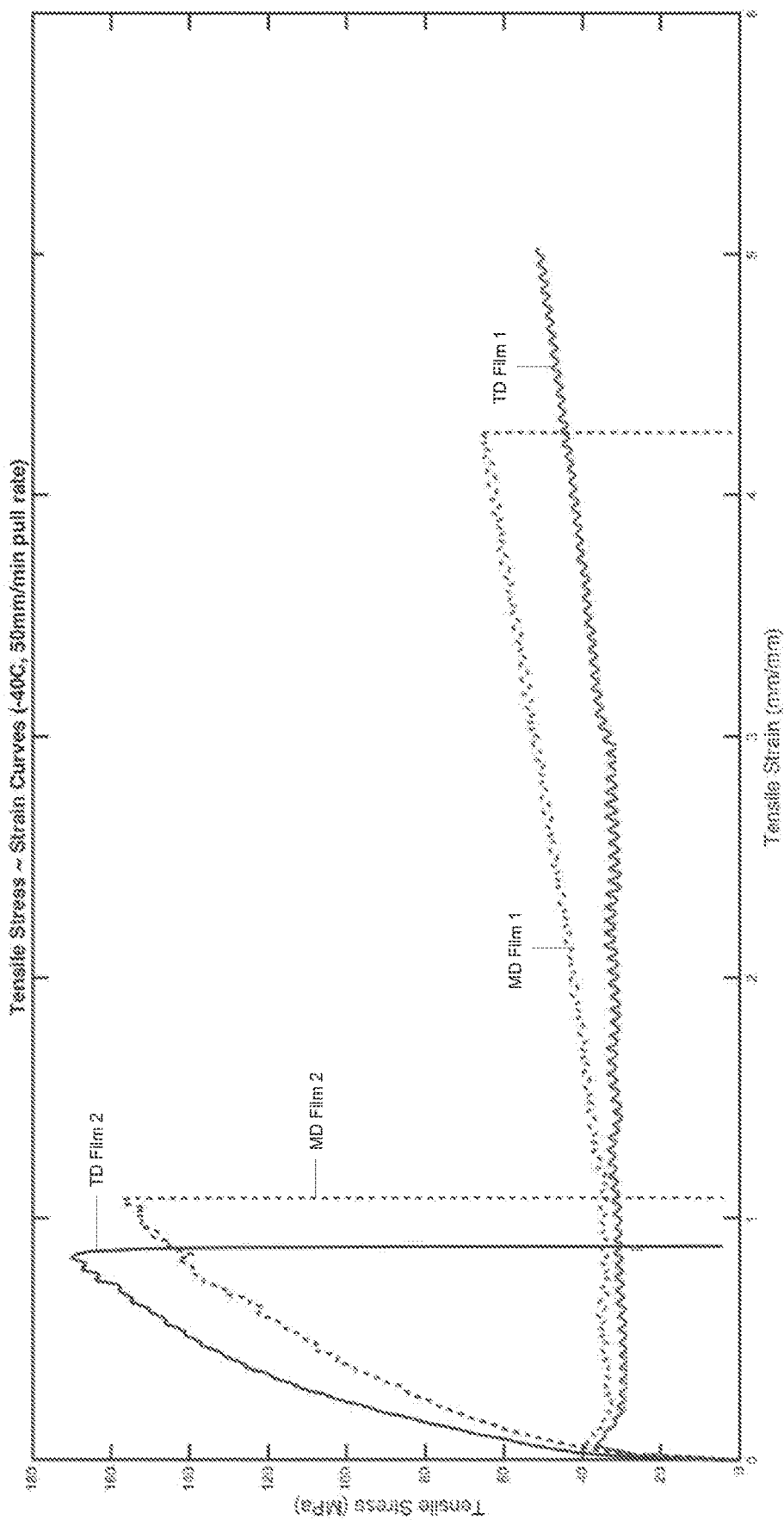
Figure 16B:
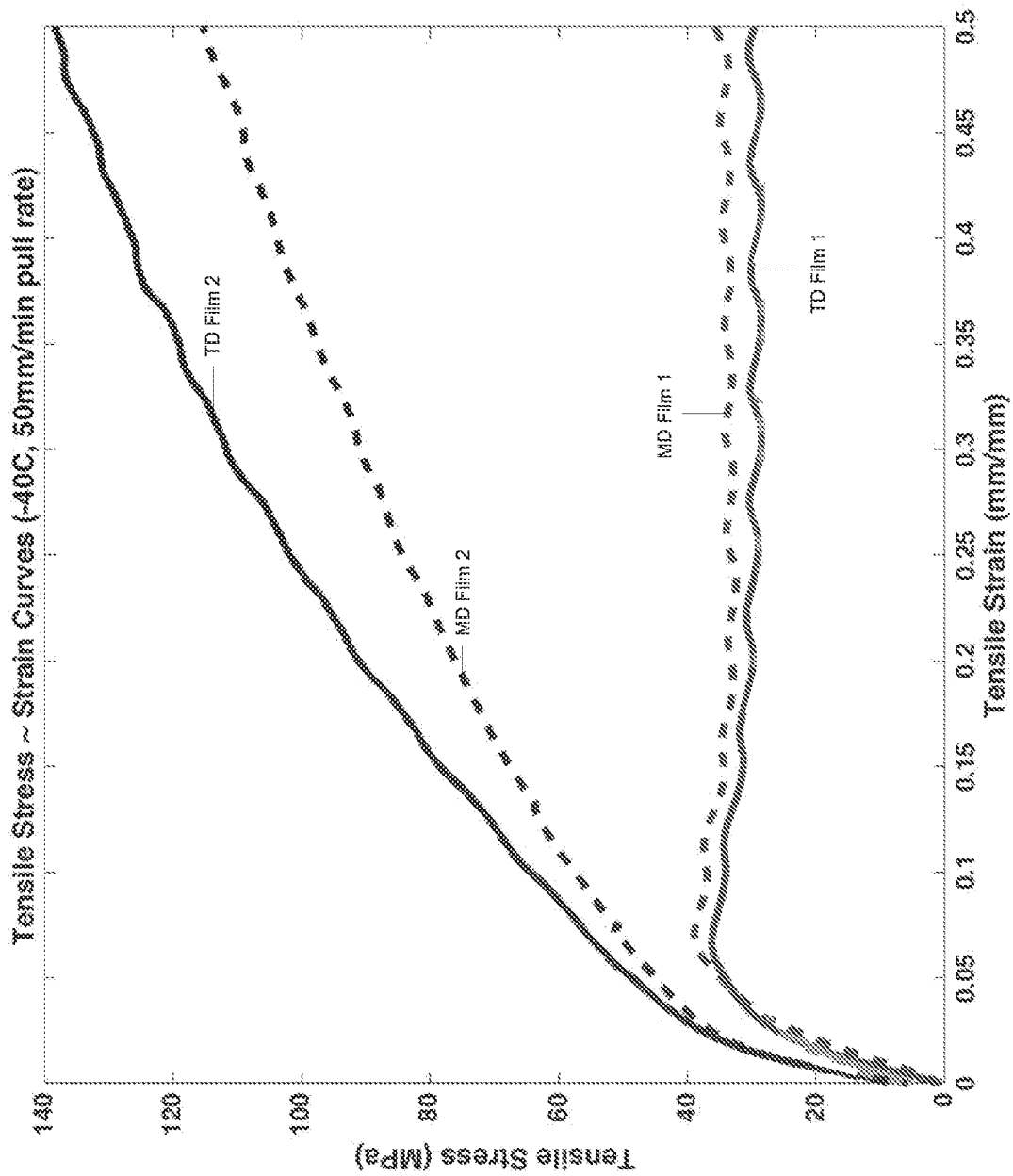
Figure 17:
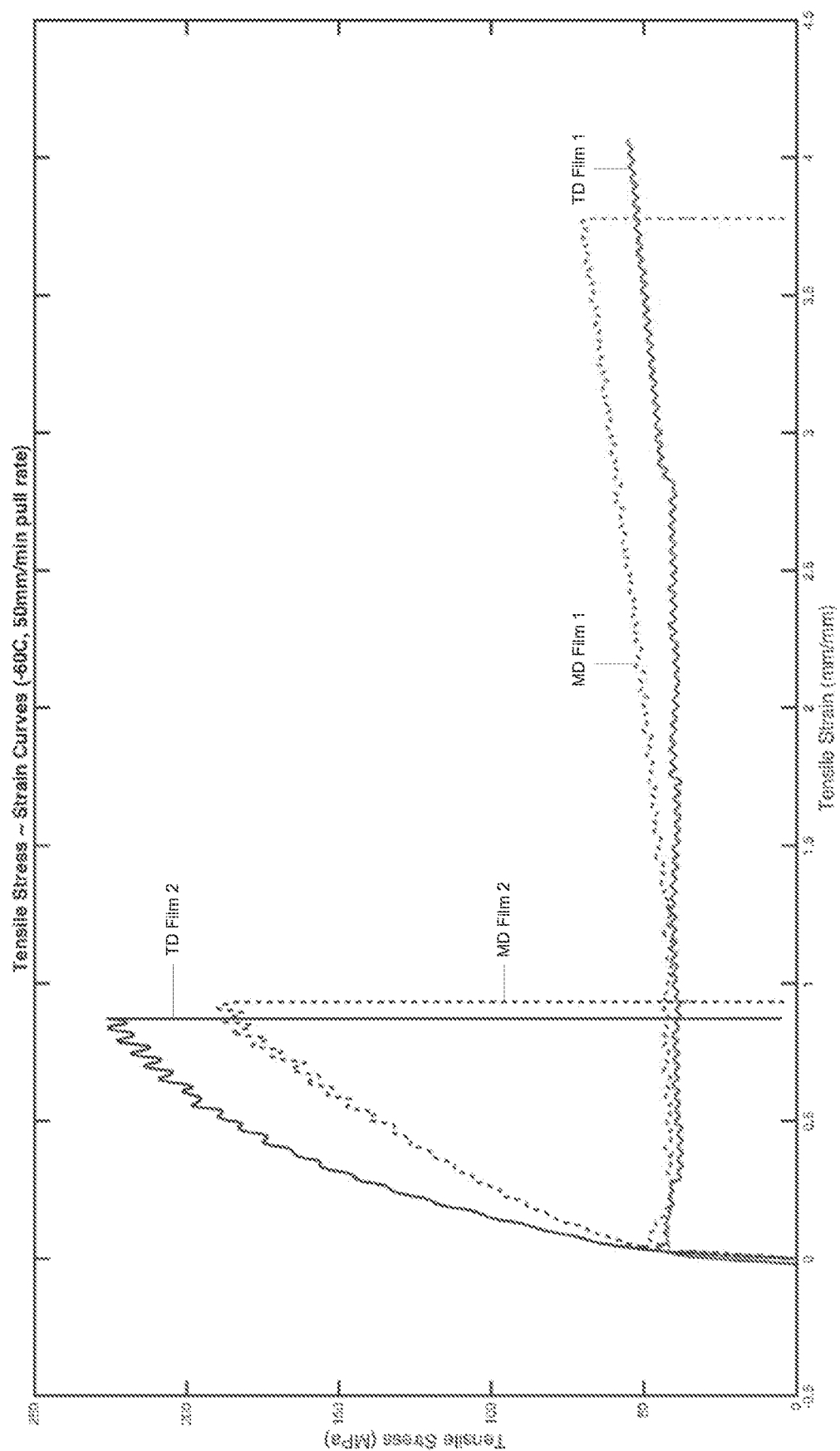

FIGS. 15-17 provide comparisons of tensile strength tests of Film 1 and Film 2 in MD (dashed lines) and TD (solid lines) at 50 millimeters per minute for 23 C (FIG. 15), −40 C (FIGS. 16A and 16B), and −60 C (FIG. 17). FIG. 16B s a detail view of FIG. 16A from tensile stress from 0 to 0.5 mm/mm. As can be seen, Film 2 is able to withstand significantly higher tensile stress (force per area) with a lower resulting strain (amount of extension per length) before failure than Film 1 at each of the different temperatures before failing. For instance, TD tensile strain for Film 2 is less than 2 mm/mm for a tensile stress of 1000 MPa at 23° C. with a 50 mm/min pull rate, the MD tensile strain of Film 2 is less than 2 mm/min for a tensile stress of 100 MPa at 23° C. with a 50 mm/min pull rate, the TD tensile strain of Film 2 is less than 2 mm/mm for a tensile stress of 140 MPa at −40° C. with a 50 mm/min pull rate, the MD tensile strain of Film 2 is less than 2 mm/min for a tensile stress of 140 MPa at −40° C. with a 50 mm/min pull rate, the TD tensile strain of Film 2 is less than 2 min/mm for a tensile stress of 150 MPa at −60° C. with a 50 mm/min pull rate, and the MD tensile strain is less than 2 mm/mm for a tensile stress of 150 MPa at −60° C., with a 50 mm/min pull rate. This high tensile strength may correspond to a stiffer film which has few stress areas. As can be seen, Film 2 behaves similarly Film 2 in the early part of the curve, though Film 2 demonstrates much higher strength prior to weakening.

Figure 18:
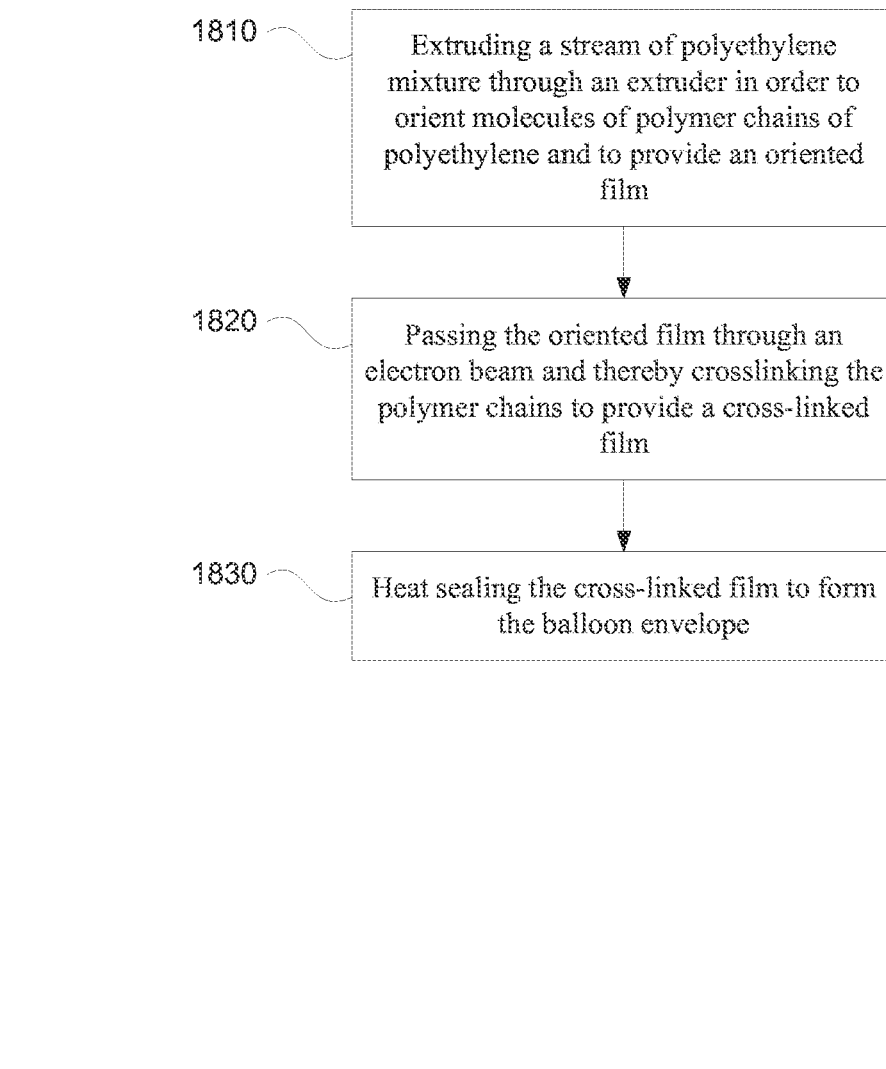
FIG. 18 is an example flow diagram in accordance with aspects of the disclosure.

FIG. 18 is an example flow diagram of some of the features described above for manufacturing a balloon envelope for use in a stratospheric balloon system. In this example, a stream of polyethylene mixture is extruded through an extruder in order to orient molecules of polymer chains of polyethylene and to provide an oriented film at block 1810. The oriented film is passed through an electron beam and thereby crosslinking the polymer chains to provide a cross-linked film at block 1820. The crosslinked film is heat sealed to form the balloon envelope at block 1830.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings cart identify the same or similar elements.

The invention claimed is:

1. A balloon envelope for use in a stratospheric balloon, the balloon envelope comprising:
   a plurality of gores; and
   a plurality of tendons, each tendon of the plurality of tendons arranged at a respective one or more of the plurality of gores;
   the balloon envelope including a cross-linked film comprising an extruded polyethylene mixture having oriented molecules and crosslinked polymer chains, wherein the balloon envelope is formed by a process of:
   heat bonding the cross-linked film to form the plurality of gores; and
   bonding each of the plurality of tendons to each of the respective one or more of the plurality of gores,
   wherein crystallinity of the balloon envelope is greater than 50% and less than 62% after the process,
   wherein transverse direction ("TD") tensile strain is less than 2 mm/mm for a tensile stress of 150 MPa at −60° C. with a 50 mm/min pull rate, and
   wherein meridional direction ("MD") tensile strain is less than 2 mm/mm for a tensile stress of 150 MPa at −60° C. with a 50 mm/min pull rate.

2. The balloon envelope of claim 1, wherein TD tensile strain is less than 2 mm/mm for a tensile stress of 100 MPa at 23 C with a 50 mm/min pull rate.

3. The balloon envelope of claim 1, wherein MD tensile strain is less than 2 mm/mm for a tensile stress of 100 MPa at 23 C with a 50 mm/min pull rate.

4. The balloon envelope of claim 1, wherein TD tensile strain is less than 2 mm/mm for a tensile stress of 140 MPa at −40 C with a 50 mm/min pull rate.

5. The balloon envelope of claim 1, wherein MD tensile strain is less than 2 mm/mm for a tensile stress of 140 MPa at −40° C. with a 50 mm/min pull rate.

6. The balloon envelope of claim 1, wherein high-rate elongation at −80 C for TD is greater than 20%.

7. The balloon envelope of claim 1, wherein thermal emissivity is less than 0.03 at 193K.

8. The balloon envelope of claim 1, wherein thermal emissivity is less than 0.04 at 233K.

9. The balloon envelope of claim 1, wherein thermal emissivity is less than 0.05 at 298K.

10. The balloon envelope of claim 1, wherein solar absorptivity is less than 0.01 at 298K.

11. The balloon envelope of claim 1, wherein a thickness of the cross-linked film of the balloon envelope less than 1.5 mil and a strength to weight ratio of the balloon envelope is greater than 1 MPa/(dt*g/cm$^3$).

12. A balloon envelope for use in a stratospheric balloon, the balloon envelope comprising:
    a plurality of gores; and
    a plurality of tendons, each tendon of the plurality of tendons arranged at a respective one or more of the plurality of gores;
    wherein crystallinity of the balloon envelope is greater than 50% and less than 62%; and
    wherein a thickness of the balloon envelope less than 1.5 mil and a strength to weight ratio of the balloon envelope is greater than 1 MPa/(dt*g/cm$^3$).

13. The balloon envelope of claim 12, wherein TD tensile strain is less than 2 mm/mm for a tensile stress of 100 MPa at 23 C with a 50 mm/min pull rate.

14. The balloon envelope of claim 12, wherein MD tensile strain is less than 2 mm/mm for a tensile stress of 100 MPa at 23 C with a 50 mm/min pull rate.

15. The balloon envelope of claim 12, wherein TD tensile strain is less than 2 mm/mm for a tensile stress of 140 MPa at −40 C with a 50 mm/min pull rate.

16. The balloon envelope of claim 12, wherein MD tensile strain is less than 2 mm/mm for a tensile stress of 140 MPa at −40° C. with a 50 mm/min pull rate.

17. The balloon envelope of claim 12, wherein TD tensile strain is less than 2 mm/mm for a tensile stress of 150 MPa at −60° C. with a 50 mm/min pull rate.

18. The balloon envelope of claim 12, wherein MD tensile strain is less than 2 mm/mm for a tensile stress of 150 MPa at −60° C. with a 50 mm/min pull rate.

19. The balloon envelope of claim 12, wherein high rate elongation at −80 C for TD is greater than 20%.

20. The balloon envelope of claim 12, wherein thermal emissivity is less than 0.03 at 193K.

21. The balloon envelope of claim 12, wherein thermal emissivity is less than 0.04 at 233K.

22. The balloon envelope of claim 12, wherein thermal emissivity is less than 0.05 at 298K.

23. The balloon envelope of claim 12, wherein solar absorptivity is less than 0.01 at 298K.

* * * * *